JOSEPH LEWIS.
Improvement in Valves.
No. 114,572. Patented May 9, 1871.
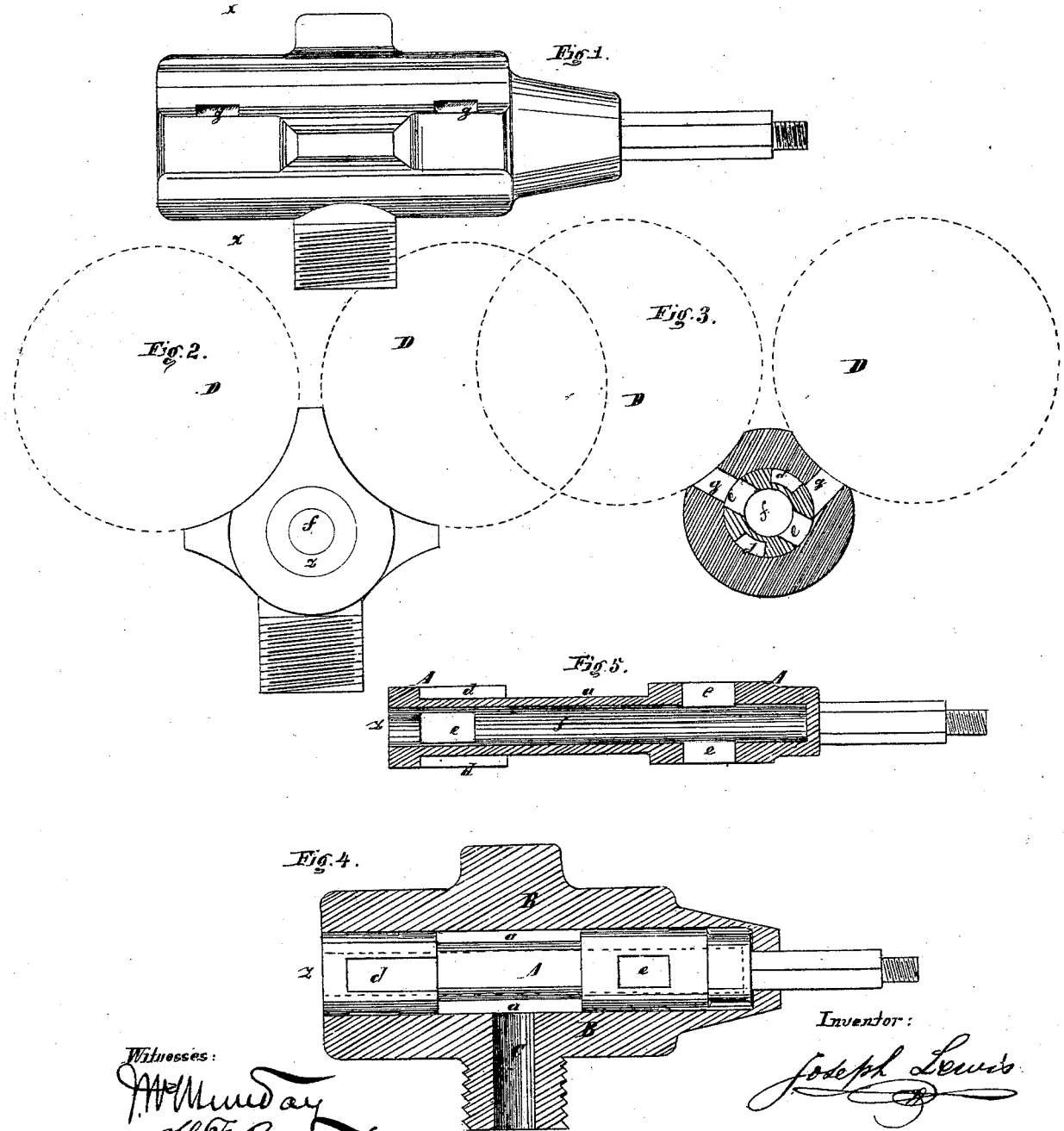

UNITED STATES PATENT OFFICE.

JOSEPH LEWIS, OF MANCHESTER, COUNTY OF LANCASTER, ENGLAND.

IMPROVEMENT IN VALVES.

Specification forming part of Letters Patent No. 114,572, dated May 9, 1871.

*To all whom it may concern:*

Be it known that I, JOSEPH LEWIS, of Manchester, in the county of Lancaster, England, have invented certain Improvements in Valves; and I do hereby declare that the following is a full, clear, and exact description thereof, reference being had to the accompanying drawings, which, together with the letters and figures marked thereon, form part of this specification, and in which—

Figure 1 is a side view of my invention. Fig. 2 is an end view of same, showing the exhaust. Fig. 3 is a section on line $x\ x$ of Fig. 1, the relative position of the cylinders in the last two figures being indicated by dotted lines. Fig. 4 is a central longitudinal section of the entire valve. Fig. 5 is a central longitudinal section of the revolving core or plug.

Like letters of reference made use of in the several figures indicate like parts.

This invention relates to a rotary valve to be used, as in case of ordinary valves, for regulating the flow of steam, water, and other fluids; and my improvement consists of a cylindrical valve rotating or oscillating within a casing. In this casing I form the ports, while the inlet and exhaust passages are formed in the movable part. The valve is separated for one arrangement in two parts by an annular groove, from which there are other grooves in the direction of the axis, but not extending through the entire face of the valve. The steam is admitted to the annular groove, and passes into the axial grooves above mentioned, and from thence through the ports in the casing as the rotary motion brings them coincident. For the exhaust, I form openings diametrically through the valve, at right angles to the grooves formed for the inlet, and which discharge through the center of the rotating valve, it being bored longitudinally for that purpose. The valve so constructed operates upon a constant and perfect equilibrium.

To enable those skilled in the art to make and use my invention, I will proceed to describe the same with particularity, making use in so doing of the aforesaid drawings.

A is the core or rotating portion of the valve, and B is the casing. This core fits within said casing to form a practically-tight joint, and to facilitate this, and to compensate for wear, the said core is made very slightly conical, the larger diameter being at $z$.

$a$ is an annular groove which separates the core into two parts, and into which the steam is admitted through the feed-pipe C.

$d$ are the axial grooves opening into the annular groove $a$, which serve as inlet-passages to conduct the steam to the ports of the cylinder or cylinders D, indicated in dotted lines.

$e$ are the exhaust-passages, which extend diametrically through the core at right angles to the grooves $d$.

$f$ is the longitudinal central cavity in the plug, into which the exhaust-steam issues, and from whence it escapes at the point $z$.

$g$ are the ports opening into the cylinders for the ingress and egress of steam, and are so placed that when the exhaust-passage $e$ is full open on port $g$ to cylinder D', then the port $g$ to cylinder D shall be perfectly closed, as shown at Fig. 3.

It will be observed that the arrangement of the said grooves and passages $d\ e$ is such that the grooves $d$ at one end are in line with or in the same diametric plane with the passages $e$ at the other end, so that while steam is being admitted to one end of the cylinder it is exhausting from the other. Now, as the core is revolved, the groove $d$ succeeds the passage $e$ at one end, and the passage $e$ succeeds the groove $d$ at the other end, and the supply and exhaust to and from the cylinder is consequently reversed.

By making a double set of ports in the casing, as shown in the drawings, I am able to supply steam to two cylinders alternately from one valve.

I prefer to revolve the core A by appropriate mechanism, but it may be worked by oscillation instead, as will be readily understood.

The above-described construction and arrangement produce a perfect equilibrium in the valve, so that nothing in power is lost by what is termed "back pressure" on the ordinary slide-valves in use.

Having thus fully described the construction and operation of my invention, what I deem new, and desire to secure by Letters Patent, is—

The rotating core A, provided with the annular groove $a$, axial grooves $d$, diametric passages $e$, and an internal longitudinal passage, $f$, in the connection, and substantially as and for the purpose specified.

JOSEPH LEWIS.

Witnesses:
J. W. MUNDAY,
H. F. BRUNS.